United States Patent
Miyamoto et al.

[11] Patent Number: 6,033,509
[45] Date of Patent: Mar. 7, 2000

[54] METHOD FOR LAMINATING POROUS SHEET AND COARSE MESH REINFORCING MATERIAL

[75] Inventors: Tsutomu Miyamoto, Ibaraki-ken; Fusao Tokuhiro, Chiba-ken; Hiroshi Shimizu, Chiba-ken; Masato Katou, Chiba-ken, all of Japan

[73] Assignee: Nippon Petrochemicals Co., Ltd., Tokyo, Japan

[21] Appl. No.: 09/052,383

[22] Filed: Mar. 31, 1998

[30] Foreign Application Priority Data

Apr. 1, 1997 [JP] Japan .................................. 9-099666

[51] Int. Cl.[7] ...................................................... B32B 31/08
[52] U.S. Cl. ...................... 156/164; 156/177; 156/308.2; 156/309.9; 264/41; 264/171.13; 264/DIG. 47
[58] Field of Search ..................................... 156/160, 163, 156/164, 161, 229, 177, 179, 308.2, 309.9; 264/171.13, 41, DIG. 47

[56] References Cited

U.S. PATENT DOCUMENTS 4,929,303  5/1990  Sheth ...................................... 156/209

FOREIGN PATENT DOCUMENTS 46-40119  11/1971  Japan .
63-286331  11/1988  Japan .
64-90746   4/1989  Japan .

*Primary Examiner*—Jeff H. Aftergut
*Attorney, Agent, or Firm*—Weingarten, Schurgin, Gagnebin & Hayes LLP

[57] ABSTRACT

A method for laminating a porous sheet 1 and a coarse mesh reinforcing material 2 which includes an adhesive layer and is reinforced by drawing, by heat pressing with that adhesive layer in between, in which, (1) the heating temperature during heat pressing is equal to or above the melting point of the adhesive layer and equal to or below the melting point of the porous sheet, (2) a specific relationship is maintained among the difference between the heating temperature and the melting point of the adhesive layer, the difference between the heating temperature and the softening point of the porous sheet, and the heating time, and (3) the unrolling tension of the porous sheet is maintained at 200 to 550 g/mm$^2$. The method allows a reinforced laminated material that retains moisture permeability and has excellent mechanical strength to be obtained inexpensively without the occurrence of wrinkling or remarkable curling

8 Claims, 6 Drawing Sheets

$ts(°C) =$ (heating temperature) - (melting point of adhesive layer: 109°C)

$t(°C) =$ (heating temperature) - (softening point of porous sheet: 116°C)

○ : Adhesiveness  Acceptable
△ : Adhesiveness  Unacceptable
● : Moisture permeability  Acceptable
▲ : Moisture permeability  Unacceptable

Fig. 9

○ : Wrinkling and curling   Acceptable

△ : Wrinkling and curling   Unacceptable

METHOD FOR LAMINATING POROUS SHEET AND COARSE MESH REINFORCING MATERIAL

BACKGROUND OF THE INVENTION

1. Field of the Invention

The present invention relates to a method for inexpensively manufacturing a sheet having moisture permeability, water resistance and excellent mechanical strength that is used in fields such as sanitary materials, waterproof materials, packaging materials and building wall materials.

2. Description of the Related Art(s)

Porous sheets having moisture permeability and water resistance are used in various fields such as pouches for containing disposable pocket heaters, desiccants, deodorizers and deoxidizers and the like, disposable diapers, clothing, agricultural and horticultural covering materials and architectural materials such as house wraps. The demands being placed on the moisture permeability and water resistance of these sheets for use as house wraps in particular have increased recently.

Although various types of moisture-permeable, water-resistant sheets are used as house wrap materials, since asphalt felt and sheathing boards have insufficient moisture proofing and moisture resistance, they are not satisfactory as house wraps. In addition, flash-spun polyethylene non-woven fabric has excessive gas permeability, which in addition to resulting in inferior heat retention, also results in a complex manufacturing method as well as additional problems including high costs (e.g., Japanese Patent Laid-Open Publication No. 63-286331).

Therefore, although inexpensive porous sheets having moisture permeability and water resistance have been proposed, since many of these porous sheets are added large amounts of organic fillers and drawn in order to form numerous fine holes therewithin, they lack strength and result in significant problems in handling due to inferior tearing strength in particular. Various contrivances have been made to solve this problem, and ways of reinforcing these sheets by laminating coarse mesh fabric or non-woven fabric having superior strength therewith have been examined. In the lamination of the prior art, although extrusion lamination using inexpensive thermoplastic polymer for an adhesive layer is typically used, this method results in a remarkable loss of moisture permeability. As a means of solving this problem, applying an adhesive in the form of dots, applying an adhesive in the form of a matrix, or applying an adhesive in the form of an extremely thin layer (of about 3 $\mu$m) has been proposed as in, for example, Japanese Patent Laid-Open Publication No. 63-286331. However, in the case of this method, an expensive adhesive and an adhesive application process are required, which not only invite higher costs, but also make it difficult to always obtain satisfactory results since increasing adhesive strength and retaining moisture permeability are mutually offsetting.

Moreover, when heating is performed to obtain sufficient adhesive strength, problems occur including the occurrence of contraction since the porous sheet is drawn in the manufacturing process, and wrinkles are formed in the product after lamination or the appearance thereof is impaired as a result of remarkable curling. In order to compensate for these shortcomings, the direct pressing of a coarse mesh structure, having a low melting point adhesive layer on its surface, and a gas permeable polyolefin film is proposed in Japanese Patent Laid-Open Publication No. 64-90746. It is described that it is important during pressing that only the mesh structure be heated and be pressed over non-heated gas permeable polyolefin film by a high-temperature roller to prevent loss of gas permeability and moisture permeability by closing the holes of the gas permeable polyolefin film due to heat. In this method, however, adhesive strength is extremely low, and reinforcing effects are not obtained that are sufficient in practical terms.

Thus, in order to solve the above-mentioned problems of the prior art, an object of the present invention is to provide a lamination method of a porous sheet and a coarse mesh reinforcing material that allows a reinforced laminated material that retains moisture permeability and has excellent mechanical strength to be obtained inexpensively without the occurrence of wrinkling or remarkable curling.

SUMMARY OF THE INVENTION

As a result of earnest research to achieve the object mentioned above, the inventors of the present invention found that it is possible to laminate a porous sheet and a coarse mesh reinforcing material without the occurrence of wrinkling or remarkable curling by heat pressing under specific conditions, thereby leading to completion of the present invention.

More specifically, a first aspect of the present invention is to provide a method for laminating a porous sheet and a coarse mesh reinforcing material comprising a material which includes an adhesive layer having a melting point lower than said porous sheet and which is reinforced by drawing, by heat pressing with said adhesive layer in between; wherein, (1) heating temperature during heat pressing is equal to or above the melting point of the adhesive layer and equal to or below the melting point of the porous sheet, (2) when difference between the heating temperature and the melting point of the adhesive layer is represented as ts° C. (i.e. ts=(heating temperature−melting point of adhesive layer)), difference between the heating temperature and the softening point of the porous sheet is represented as t° C. (i.e. t=(heating temperature−softening point of porous sheet)), and heating time is represented as h seconds, the following relationship is maintained among them: $7.5/(ts+2)^{1.3} < h < -0.5t+3$, and (3) unrolling tension of the porous sheet is maintained within a range of 200 to 550 g/mm².

In addition, a second aspect of the present invention is to provide a lamination method as described above, in which as said coarse mesh reinforcing material, a thermoplastic resin non-woven fabric or woven fabric composed by cross-laminating or cross-weaving at least one type of uniaxial oriented material selected from (a), (b) and (c) below so that orientation axes thereof cross:

(a) a split web in which a film is uniaxially drawn longitudinally or transversely and split in a direction of drawing (split treatment);

(b) a slit web in which a film is uniaxially drawn in a direction of slits after forming a large number of slits either longitudinally or transversely in said film; and, (c) a uniaxially oriented, multi-layer tape.

BRIEF DESCRIPTION OF THE DRAWINGS

Other objects and aspects of the present invention will become apparent from the following description of embodiments with reference to the accompanying drawings in which:

FIG. 2(A) is a partial enlarged perspective view of an example of a split web, while

FIG. 3(A) is a partial enlarged perspective view of an example of a slit web, while

DETAILED DESCRIPTION OF THE PREFERRED EMBODIMENTS

When heat pressing a porous sheet and a coarse mesh reinforcing material, if the heating temperature is raised or the heating time is lengthened, although adhesive strength increases, moisture permeability decreases. In addition, wrinkles easily form in the finished product and curling becomes prominent. Conversely, if the heating temperature is lowered or the heating time is shortened, although moisture permeability is maintained and wrinkling and curling can be prevented, adhesive strength decreases significantly. Adhesive strength is particularly dependent on "the difference between heating temperature and the melting point of the adhesive layer" and on "heating time", while moisture permeability, wrinkling, curling and so forth are dependent on "the difference between the heating temperature and the softening point of the porous sheet" and "heating time". In addition, wrinkles form if the unrolling tension of the porous sheet is excessively low, while curling becomes prominent if it is excessively high.

Thus, in the present invention it is essential to satisfy the following conditions:

(1) (m.p. of adhesive layer)≦(heating temperature)≦(m.p. of porous sheet);

(2) $7.5/(ts+2)^{1.3} < h < -0.5t+3$, wherein ts=(heating temperature)−(m.p. of adhesive layer), t=(heating temperature)−(softening point of porous sheet), and h=heating time; and (3) unrolling tension within a range of 200 to 550 g/mm².

Thereby, it is possible to overcome these offsetting phenomena by laminating a porous sheet and a coarse mesh reinforcing material by heat pressing that satisfies said various conditions.

Said coarse mesh reinforcing material is a material which includes an adhesive layer having a melting point lower than that of the porous sheet to be heat pressed with the reinforcing material, can be used as a reinforcing support layer, and is reinforced by drawing, and there are no particular limitations on this material provided it does not impair the moisture permeability of the porous sheet. Uniaxially or biaxially oriented perforated film or punching film and so forth that uses thermoplastic resin as its raw material can be used for said coarse mesh reinforcing material. Preferably, a non-woven fabric or woven fabric composed by cross-laminating or cross-weaving at least one type of uniaxial oriented material selected from a split web, slit web and uniaxially oriented multi-layer tape (yarn) so that orientation axes thereof cross, or a combination thereof, is used.

Said split web is a uniaxially oriented web-like film in which a multi-layer film of at least two layers manufactured by extrusion molding such as multi-layer inflation method or multi-layer T-die method, is drawn in a longitudinal direction (lengthwise direction) or transverse direction (widthwise direction) after which a large number of splits are formed intermittently in a direction of drawing. Said slit web is a uniaxially oriented web-like film in which a large number of slits (cuts) are made longitudinally or transversely in said multi-layer film followed by drawing in a direction of the slits. In addition, said uniaxially oriented multi-layer tape (yarn) is that the multi-layer film is uniaxially drawn in a longitudinal or transverse direction before and/or after cutting said multi-layer film.

Specific examples of said non-woven fabric or woven fabric composed of said uniaxially oriented material include a non-woven fabric formed by cross-laminating split webs followed by heat pressing, a non-woven fabric formed by cross-laminating slit webs followed by heat pressing, a non-woven fabric formed by cross-laminating a split web and a slit web followed by heat pressing, a non-woven fabric formed by cross-laminating a split web or a slit web with a uniaxially oriented tape (yarn) so that orientation axes thereof cross, and a woven fabric formed by weaving uniaxially oriented multi-layer tapes (yarn).

Although that composed by cross-laminating at least one type of uniaxially oriented material selected from a split web, slit web and uniaxially oriented multi-layer tape (yarn) as described above so that orientation axes thereof cross is preferable for the non-woven fabric composed of uniaxially oriented materials, said non-woven fabric may be laminated with orientation axes thereof in random directions or identical directions depending on the application. Moreover, these woven fabric and/or non-woven fabric can also be used by composite lamination.

It is preferable that said uniaxially oriented material be a multi-layer drawn material formed by providing a layer of a second thermoplastic resin having a melting point lower than that of a crystalline first thermoplastic resin on at least one side of a layer of said crystalline first thermoplastic resin. Not only is the layer of the second thermoplastic resin an adhesive layer of a coarse mesh reinforcing material and a porous sheet, but it also acts as a mutual adhesive layer of a uniaxially oriented material during cross-lamination or weaving of a uniaxially oriented material such as said (a) through (c).

Examples of said first thermoplastic resin include homopolymers of α-olefins such as high-density and medium-density polyethylene, polypropylene, polybutene-1, poly-4-methylpentene-1 and polyhexene-1; polyolefins such as copolymers of α-olefins such as propylene-ethylene copolymer; polyimides; polyesters; polycarbonates and polyvinyl alcohols.

Examples of said second thermoplastic resin having a melting point lower than the melting point of said first thermoplastic resin include high-density, medium-density and low-density polyethylene, straight-chain low-density polyethylene, ultra-low-density polyethylene, ethylene-vinyl acetate copolymer, ethylene-acrylic acid copolymer, ethylene-methacrylic acid copolymer, ethylene-acrylic ester copolymers such as ethylene-ethyl acrylate copolymer, ethylene-methacrylic ester copolymers such as ethylene-ethyl methacrylate copolymer, ethylene-(maleate or ester thereof) copolymers; propylene-based polymers such as polypropylene and propylene-ethylene copolymer, and polyolefins modified with unsaturated carboxylic acids.

Moreover, said second thermoplastic resin may be a mixture of these resins or other polyolefin-based resins, examples of which include a mixture of a polyethylene-based resin such as high-density polyethylene or ethylene-α-olefin copolymer with a random copolymer of, for example, propylene and ethylene or 1-butene and so forth.

For manufacturing reasons and for the reason of preventing a decrease in strength increased by drawing or rolling to form a uniaxially oriented material, difference between the melting points of the second thermoplastic resin and said first thermoplastic resin is preferably at least 5° C., and more preferably within a range of 10–50° C.

Specific examples of resin constitutions of a multi-layer film include high-density polyethylene (HDPE)/low-density polyethylene (LDPE), LDPE/HDPE/LDPE, HDPE/ethylene-vinyl acetate copolymer (EVA), EVA/HDPE/EVA, polypropylene (PP)/propylene-ethylene copolymer (PEC), PEC/PP/PEC, polyester (PEs)/copolymer polyester (CPEs) and CPEs/PEs/CPEs.

The porous sheet used in the present invention is manufactured by drawing a film prepared by using a thermoplastic resin such as polyolefin as a main raw material, and has moisture permeability and water resistance. Examples of this porous sheet include (1) a film obtained by blending non-compatible polymers of thermoplastic resins or inorganic fine particles and a thermoplastic resin followed by drawing, (2) a film obtained by cooling a resin such as polyolefin under high shearing force, to form a specific crystalline structure followed by drawing (Japanese Patent Publication No. 46-40119), and (3) a film obtained by adding extractable ingredients to a resin followed by extraction.

A porous sheet having a thickness within the range of 5–500 μm, and preferably 10–100 μm, a mean pore size within the range of 0.01–50 μm, and preferably 0.05–5 μm, and a porosity within the range of 30–90% is preferably selected for said porous sheet.

The moisture permeability of the porous sheet having said thickness is normally 500 g/m$^2 \cdot$24 hr or more, and preferably 1000 g/m$^2 \cdot$24 hr or more, while the gas permeability (Gurley permeability) is 5000 sec/100 cc or less, and preferably 2000 sec/100 cc or less.

There are no particular limitations on the thermoplastic resin that forms said porous sheet, examples of which include polyethylene resins such as high-density, medium-density and low-density polyethylene, straight-chain, low-density polyethylene, ultra-low-density polyethylene, ethylene-propylene copolymer rubber, ethylene-propylene-diene copolymer rubber, ethylene-vinyl acetate copolymer, ethylene-acrylic acid copolymer, ethylene-methacrylic acid copolymer, ethylene-acrylic ester copolymer and ethylene-methacrylic ester copolymer, polyolefin-based resins such as polypropylene-based resins, polyimide-based resins, polyester-based resins, polyvinyl chloride-based resins, polycarbonate-based resins and polyurethane. However, porous sheets are preferable in terms of being inexpensive, flexible, pliant, attractive and so forth that are obtained by drawing a composition in which filler is blended into a polyolefin-based resin.

Inorganic and organic fillers that are routinely used can be used for said filler, examples of which include inorganic fillers such as calcium carbonate, basic magnesium carbonate, sodium aluminosilicate, potassium aluminosilicate, lithium aluminosilicate, aluminum hydroxide, magnesium hydroxide, calcium oxide, magnesium oxide, silica, alumina, titanium oxide, clay, talc, barium sulfate and calcium sulfate, as well as organic fillers such as cellulose-based powders such as wood meal and pulp meal. These may be used alone or as a mixture of two or more types.

The present invention will be described in further detail by way of example with reference to the accompanying drawings.

Figure 1:
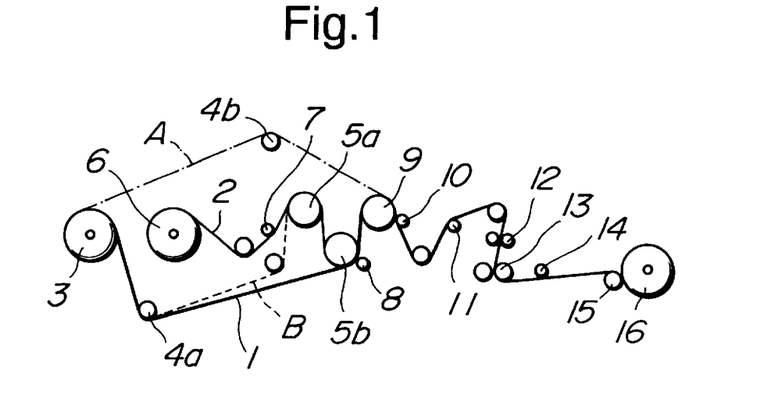
FIG. 1 is a schematic side view showing processes of the lamination method of the present invention.

FIG. 1 is a schematic side view showing process of the lamination method of the present invention. A porous sheet 1 is unrolled across a turning roller 4a from a raw material roller 3 after which it reaches a second preheating roller 5b. On the other hand, a reinforcing material 2 is unrolled from a raw material roller 6 after which wrinkle formation is prevented with an expander roller 7. After then passing over a first preheating roller 5a, said reinforcing material 2 is joined with the porous sheet 1 while being preheated with a second preheating roller 5b, and then pinched with a pinching roller 8 and pressed with a pinching roller 10 while being additionally heated with a final pressing roller 9. In a case of lengthening the preheating time of the porous sheet 1, the porous sheet 1 should be fed to the first preheating roller 5 following the path indicated with broken line B where it may be superimposed with the reinforcing material. Conversely, when desiring to shorten preheating time, the porous sheet 1 should be fed directly to the final pressing roller 9 after passing over the turning roller 4b following the path indicated with dotted line A.

After pressing, wrinkle formation is prevented with an expander roller 11, both sides of the laminated sheet are trimmed to a predetermined width with a scoring cutter 12, the laminated sheet is transported with a pinching roller 13 and then wound up on a finished product roller 16 by making contact with a surface winding roller 15 while wrinkles are prevented from being formed with an expander roller 14.

Although not shown in the drawings, a brake is provided to the raw material roller 3 to control the unrolling tension of the porous sheet 1, and pressure at the turning roller 4a (or 4b) is detected with a pressure sensor provided to the bearing of the turning roller 4a (or 4b). According to the resulted construction, the brake should then be controlled so as to obtain the predetermined tension of the porous sheet to be unrolled.

The preheating rollers 5a and 5b and the final pressing roller 9, which perform heating, are heated using steam, electrical, oil or induction heating. Temperature at these rollers is detected by an infrared ray or non-contact type of temperature sensor to regulate the temperature of heating medium and maintain the predetermined surface temperature thereof.

Heating time is adjusted by (1) a method in which line speed (unrolling speed) is adjusted, (2) a method in which a turning roller is provided and contact angle between the heating rollers and the porous sheet unrolled from the raw material roller is adjusted by changing position of a turning roller, or (3) a method in which pathway traveled by the porous sheet is changed as shown by lines A and B of FIG. 1, for example.

Furthermore, a corona discharge treatment machine may be installed before or between the preheating rollers 5a and 5b to perform corona discharge treatment on the surfaces of the porous sheet 1 and/or the reinforcing material 2 in consideration of improving adhesiveness and improving printing of the finished product.

Figure 2A:
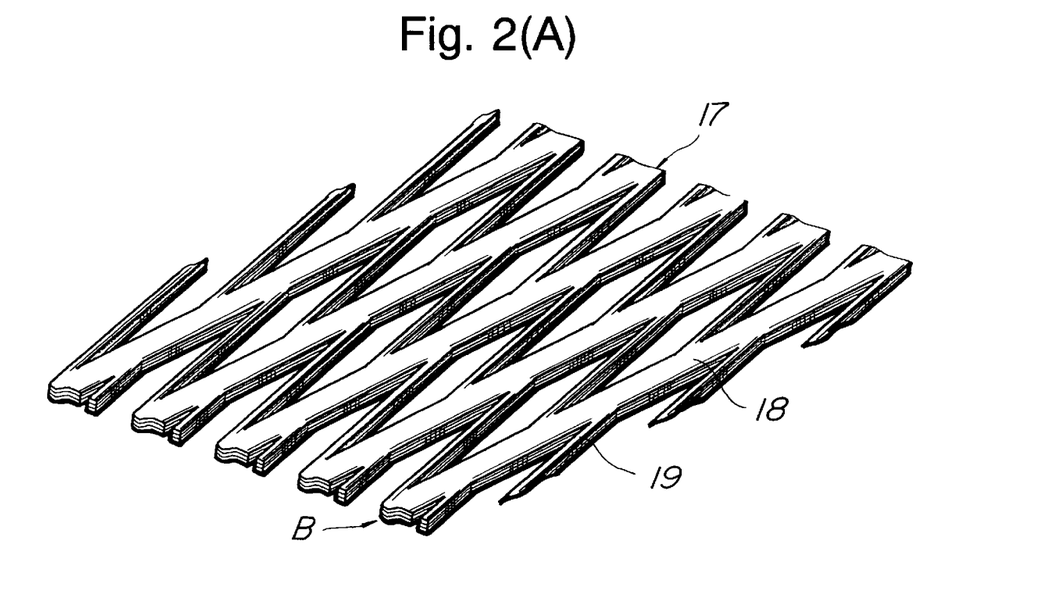

FIG. 2(A) is a partial enlarged perspective view showing a split web split woven (split treated) in a longitudinal direction after uniaxially drawing a film longitudinally as an example of a uniaxially oriented material that forms the coarse mesh reinforcing material used in the present invention. A split web 17, which is made of thermoplastic resin as a raw material, is manufactured by using a first thermoplastic resin and a second thermoplastic resin having a melting point lower than that of the first thermoplastic resin, drawing a multi-layer film of at least two layers manufactured by extrusion molding such as multi-layer inflation method or multi-layer T-die method and so forth, in the longitudinal direction in a drawing ratio of 1.1–15, preferably 3–10, and then zigzag split weaving (split treating) it in the same direction using a splitter. As a result, said multi-layer film is in the form of a mesh, and becomes coarse mesh split web 17 by spreading the mesh. Split web 17 is a uniaxially oriented material across its entire width having strength in the longitudinal direction. In addition, reference numeral 18 in the drawing indicates a trunk fiber, while reference numeral 19 indicates a branch fiber.

Figure 2B:
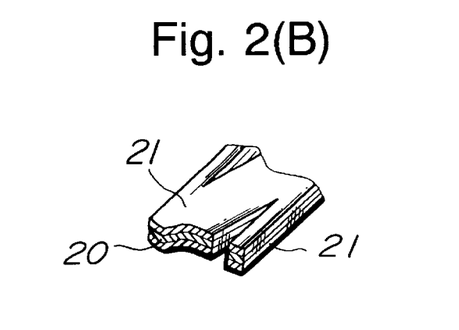
FIG. 2(B) is a partial enlarged perspective view of portion B of FIG. 2(A)

FIG. 2(B) is an enlarged perspective view of portion B in FIG. 2(A). Split web 17 is composed of a three-layer structure in which a second thermoplastic resin 21 is laminated on both sides of a first thermoplastic resin 20.

Figure 3A:
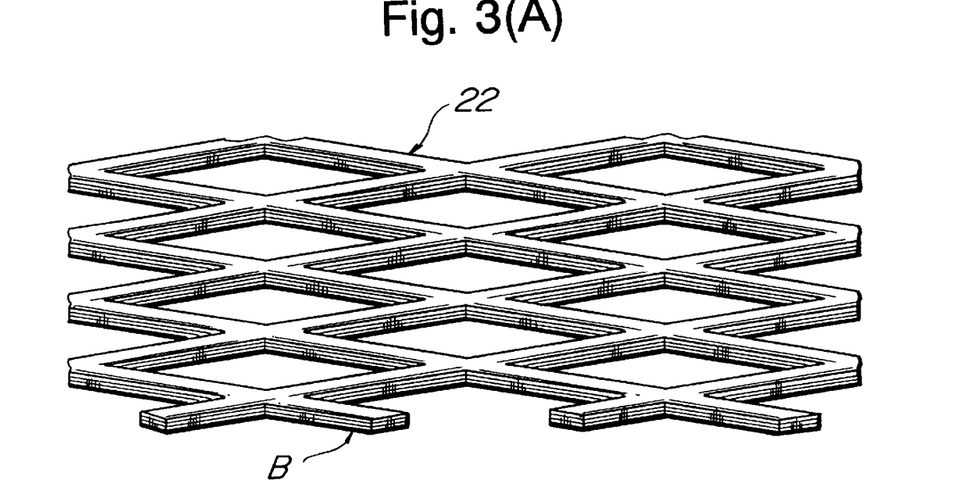

FIG. 3(A) is a partial enlarged perspective view showing a slit web in which a film is uniaxially drawn in a transverse direction after forming a large number of slits transversely as another example of a uniaxially oriented material that forms the coarse mesh reinforcing material used in the present invention. Slit web 22, which is made of thermoplastic resin as a raw material, is manufactured by forming intermittent zigzag slits in parallel in the transverse direction (direction of width) using, for example, a hot knife, in those portions excluding both edges of said multi-layer film, drawing the film in the transverse direction in a drawing ratio of 1.1–15, preferably 3–10 to be a mesh-like film, and then forming a coarse mesh uniaxially oriented material in which the mesh has been spread, having strength in the transverse direction. Preferably, after finely orienting a multi-layer film by rolling by about 1.1–3 times in a longitudinal direction, slit treatment is performed in zigzag fashion in the transverse direction with a hot knife followed by transverse drawing.

Figure 3B:
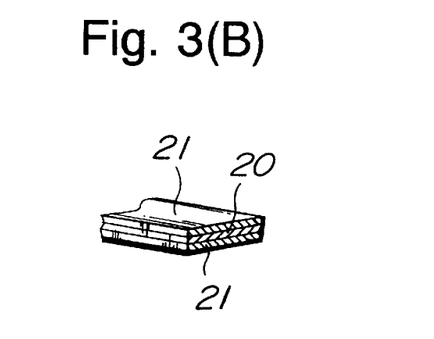
FIG. 3(B) is a partial enlarged perspective view of portion B of FIG. 3(A)

FIG. 3(B) is a partial enlarged view of portion B of FIG. 3(A). Slit web 22 is composed of a three-layer structure in which a second thermoplastic resin 21 is laminated on both sides of a first thermoplastic resin 20.

Figure 4:
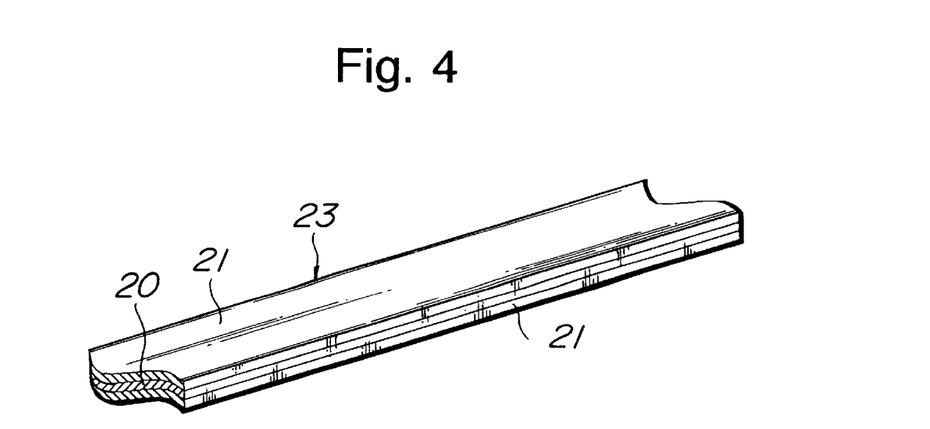
FIG. 4 is a partial enlarged perspective view of an example of a uniaxially oriented multi-layer tape.

Moreover, FIG. 4 is a partial enlarged perspective view showing a uniaxially oriented multi-layer tape as another example of a uniaxially oriented material that forms the coarse mesh reinforcing material used in the present invention. A uniaxially oriented multi-layer tape 23, which is made of thermoplastic resin as a raw material, is manufactured to be a multi-layer, drawn tape by using a first thermoplastic resin and a second thermoplastic resin having a melting point lower than that of the first thermoplastic resin, drawing a multi-layer film of at least two layers manufactured by extrusion molding such as multi-layer inflation method or multi-layer T-die method and so forth before and/or after cutting to be uniaxially oriented in the longitudinal or transverse direction in a drawing ratio of 1.1–15, and preferably 3–10, and then cutting.

Uniaxially oriented multi-layer tape 23 is also composed of a three-layer structure in which a second thermoplastic resin 21 is laminated on both sides of a first thermoplastic resin 20 in the same manner previously described.

Although there are no particular limitations on the thickness of the second thermoplastic resin of the multi-layer tape or film after drawing, it is preferably 1 μm or more in order to satisfy various physical properties such as adhesive strength during thermal adhesion and so forth, and more preferably 4 μm or more in terms of manufacturing and product quality.

Figure 5:
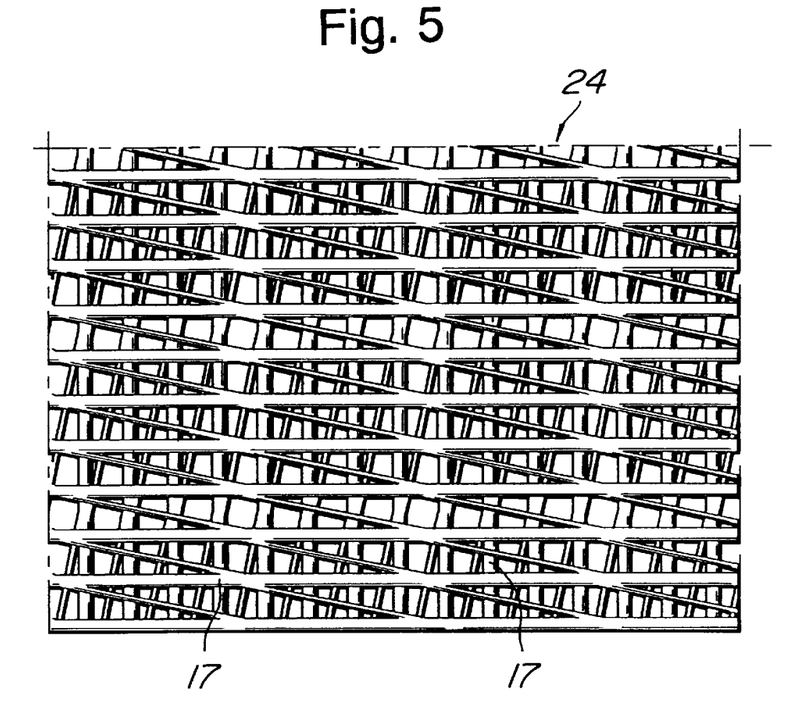
FIG. 5 is a partial plane view of an example of a non-woven fabric laminated with split webs.
Figure 6:
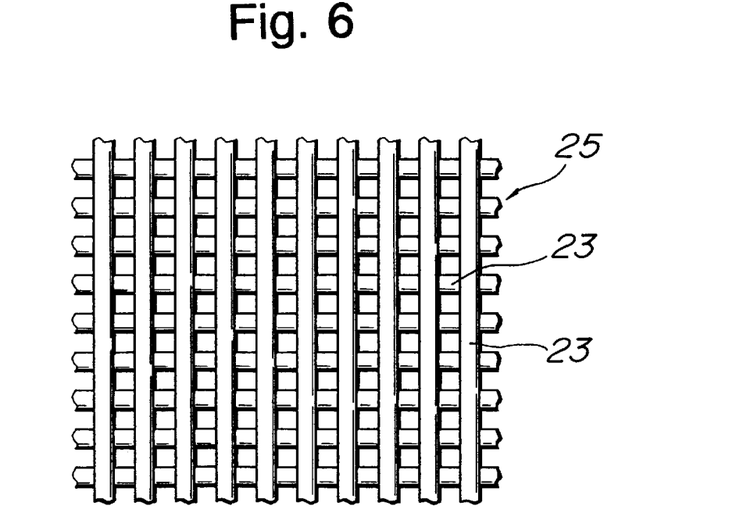
FIG. 6 is a partial plane view of an example of a non-woven fabric laminated with uniaxially oriented multi-layer tapes.
Figure 7:
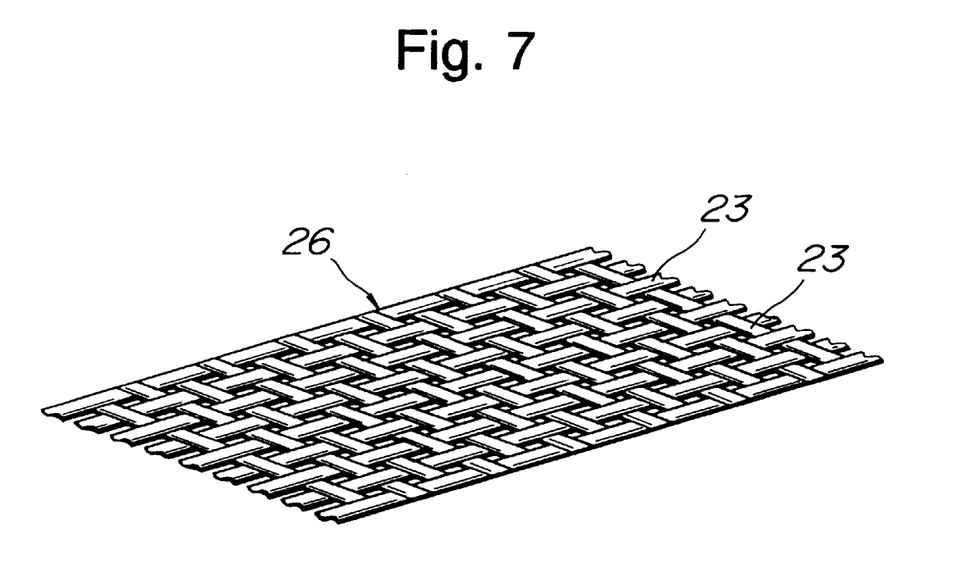
FIG. 7 is a partial perspective view of an example of a woven fabric woven with uniaxially oriented multi-layer tapes.

FIGS. 5 through 7 are specific examples of the coarse mesh reinforcing material used in the present invention. FIG. 5 is a partial plane view of a non-woven fabric 24 laminated with two sheets of split webs 17. FIG. 6 is a partial plane view of a non-woven fabric 25 laminated with two sets of uniaxial oriented multi-layer tapes 23, and FIG. 7 is a partial perspective view of a woven fabric 26 woven with uniaxially oriented multi-layer tapes 23.

Specific examples of a gas-permeable, uniaxially oriented material in the form of non-woven fabric 24 include "NISSEKI WARIFU" (trade name, manufactured by Nisseki Plast Co., Ltd.).

EXAMPLES

The following provides a description of examples of the present invention and comparative examples.

A drawn thin film comprising straight-chain, low-density polyethylene and inorganic filler was used as a porous sheet according to the present invention, and a laminated material prepared by cross-laminating two sheets of split webs prepared from a three-layer film in which low-density polyethylene films as adhesive layers were laminated on both sides of high-density polyethylene film, while crossing their orientation axes, was used as a coarse mesh reinforcing material according to the present invention. Both materials were laminated. Their properties are as described below.

Porous sheet: Melting point: 125° C., thickness: 35 μm, softening point: 116° C.

Main Layer of Reinforcing material: Melting point: 129° C., thickness: 100 μm

Adhesive layer of Reinforcing material: Melting point: 109° C., thickness: 10 μm The measuring conditions and evaluation results of tests relating to adhesiveness are shown in Table 1, while the measurement conditions and evaluation results of tests relating to moisture permeability are shown in Table 2. In these examples, heating temperature during heat pressing both material and unrolling tension of the porous sheet when unrolling satisfy the range of conditions in the present invention.

Results are evaluated according to the following methods and standards.

(1) Adhesiveness

After adequately pressing on and attaching adhesive tapes to the porous sheet side and reinforcing material side of the portion at the edge of the product, the adhesive tapes were peeled off on both sides.

Acceptable: Only adhesive tapes peel off

Unacceptable: Separation between the porous sheet and reinforcing material (2) Curling When a sample measuring 1 m×1 m is cut out of the product, the sample is placed on a flat board, one side of the sample is fixed and the other three sides thereof are allowed to remain free, both sides of the sample curl to a certain extent. The distance between the innermost sides of the curled portions are measured and evaluated according to the following standards.

Acceptable: 670 mm or more (at least ⅔ of the total width or total length)

Unacceptable: Less than 670 mm (3) Wrinkling

Acceptable: No wrinkles whatsoever

Unacceptable: Wrinkles are present although only slightly (4) Moisture Permeability Moisture permeability is measured at 40° C. and 90% humidity in compliance with JIS Z0208.

Acceptable: 6000 g/m²·24 hr. or more

Unacceptable: Less than 6000 g/m²·24 h.

TABLE 1

Processing Conditions and Adhesiveness Test Results

| Experiment no. | Heating temperature (°C.) | Heating temperature - melting point of adhesive layer ts (°C.) | Heating time h (seconds) | Adhesiveness |
|---|---|---|---|---|
| 1 | 110 | 1 | 1.9 | Acceptable |
| 2 | 110 | 1 | 1.5 | Unacceptable |
| 3 | 110 | 1 | 0.3 | Unacceptable |
| 4 | 112 | 3 | 1.5 | Acceptable |
| 5 | 112 | 3 | 1.0 | Acceptable |
| 6 | 112 | 3 | 0.6 | Unacceptable |
| 7 | 115 | 6 | 1.9 | Acceptable |
| 8 | 115 | 6 | 0.6 | Acceptable |
| 9 | 115 | 6 | 0.3 | Unacceptable |
| 10 | 120 | 11 | 1.9 | Acceptable |
| 11 | 120 | 11 | 0.3 | Acceptable |

TABLE 2

Processing Conditions and Moisture Permeability Test Results

| Experiment no. | Heating temperature (°C.) | Heating temperature - softening point of porous sheet t (°C.) | Heating time h (seconds) | Moisture permeability |
|---|---|---|---|---|
| 21 | 115 | −1 | 1.9 | Acceptable |
| 22 | 115 | −1 | 0.3 | Acceptable |
| 23 | 116 | 0 | 2.5 | Acceptable |
| 24 | 118 | 2 | 1.5 | Acceptable |
| 25 | 118 | 2 | 1.0 | Acceptable |
| 26 | 120 | 4 | 2.5 | Unacceptable |
| 27 | 120 | 4 | 1.5 | Unacceptable |
| 28 | 120 | 4 | 0.3 | Acceptable |
| 29 | 121 | 5 | 1.0 | Unacceptable |

Figure 8:
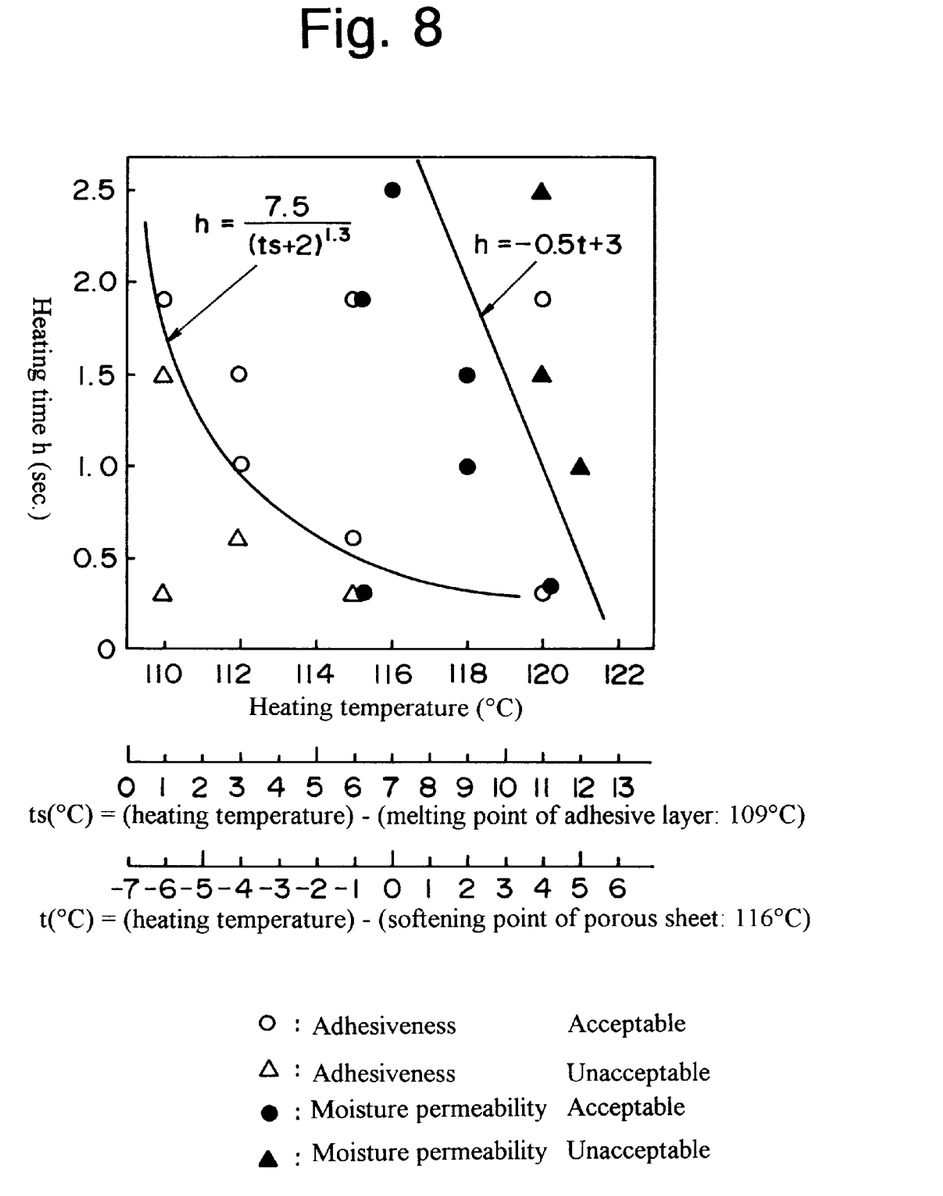
FIG. 8 is a graph showing each measurement condition and evaluation result for adhesiveness and moisture permeability.

FIG. 8 is a graph summarizing the results in Tables 1 and 2.

As shown in this graph, the limit on the acceptable level of adhesiveness is represented with the curve of the equation of $h=7.5/(ts+2)^{1.3}$. If value of heating time h lies in the area above this curve, then adhesiveness of the material is favorable. In addition, the limit on the acceptable level of moisture permeability is represented with the straight line of the equation of $h=-0.5t+3$. If the value of heating time h lies in the area below this straight line, then moisture permeability of the material is acceptable. Thus, it can be understood that both adhesiveness and moisture permeability are favorable in the case of heat pressing under conditions that satisfy the equation of $7.5/(ts+2)^{1.3}<h<-0.5t+3$.

In addition, measurement conditions and evaluation results of tests relating to wrinkling and curling are shown in Table 3.

TABLE 3

Processing Conditions and Wrinkling and Curling Test Results

| Experiment no. | Heating temperature (°C.) | Heating temperature - softening temperature of porous sheet t (°C.) | Heating time h (seconds) | Unrolling tension (g/mm$^2$) | Wrinkling and curling |
|---|---|---|---|---|---|
| 31 | 110 | −6 | 1.9 | 400 | Acceptable |
| 32 | 115 | −1 | 1.9 | 180 | Unacceptable |
| 33 | 115 | −1 | 1.9 | 400 | Acceptable |
| 34 | 115 | −1 | 1.9 | 650 | Unacceptable |
| 35 | 120 | 4 | 1.9 | 400 | Unacceptable |
| 36 | 110 | −6 | 1.5 | 260 | Unacceptable |
| 37 | 110 | −6 | 1.5 | 400 | Acceptable |
| 38 | 115 | −1 | 1.5 | 260 | Acceptable |
| 39 | 115 | −1 | 1.5 | 400 | Acceptable |
| 40 | 120 | 4 | 1.5 | 400 | Unacceptable |
| 41 | 110 | −6 | 0.3 | 400 | Acceptable |

TABLE 3-continued

Processing Conditions and Wrinkling and Curling Test Results

| Experiment no. | Heating temperature (°C.) | Heating temperature - softening temperature of porous sheet t (°C.) | Heating time h (seconds) | Unrolling tension (g/mm²) | Wrinkling and curling |
|---|---|---|---|---|---|
| 42 | 115 | −1 | 0.3 | 180 | Unacceptable |
| 43 | 115 | −1 | 0.3 | 500 | Acceptable |
| 44 | 120 | 4 | 0.3 | 260 | Acceptable |

Figure 9:
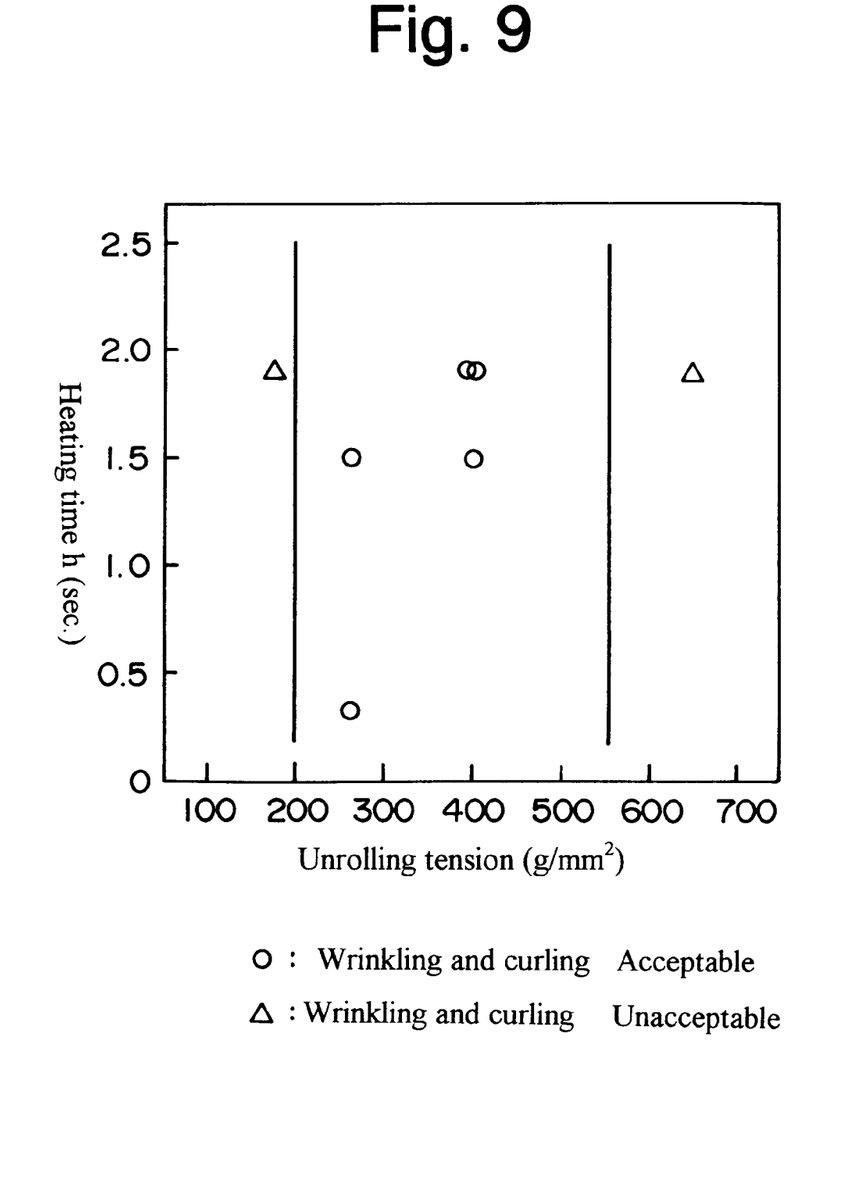
FIG. 9 is a graph showing each measurement condition and evaluation result for wrinkling and curling.

FIG. 9 is a graph that shows those results in Table 3 that satisfy the conditions of the above inequality (experiment nos. 31 through 34, 38, 39 and 44).

As shown in the graph, unrolling tension of the porous sheet has a significant effect on wrinkling and curling. Within the range over which favorable results are demonstrated for adhesiveness and moisture permeability, the occurrence of wrinkling and curling can not be prevented under tension conditions outside the range of the present invention (200–550 g/mm²).

When laminating a porous sheet and coarse mesh reinforcing material, by heat pressing under the specified conditions of the present invention, a laminated material that retains moisture permeability and has excellent mechanical strength can be obtained inexpensively without the occurrence of wrinkling or prominent curling. A reinforced laminated material obtained in this manner is suitable for use as agricultural and horticultural covering materials, civil engineering and architectural materials, distribution materials, packaging materials and so forth.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for laminating a porous sheet and a coarse mesh reinforcing material which includes a material containing an adhesive layer having a melting point lower than that of said porous sheet and which is reinforced by drawing, said laminating operation being performed by heat pressing with said adhesive layer in between said porous sheet and said coarse mesh reinforcing material; comprising the steps of supplying said porous sheet and said coarse mesh reinforcing material, each of said porous sheet and said adhesive layer of said coarse mesh reinforcing material having a different melting point, from rolls of material, each material being unrolled with a given unrolling tension, and exposing said porous sheet and said coarse mesh reinforcing material to a heating temperature for a predetermined heating time, and at the same time laminating said porous sheet and said coarse mesh reinforcing material by heat pressing, wherein, (1) relationship between the melting point of the adhesive layer, the melting point of the porous sheet and the heating temperature during heat pressing is satisfied with a following equation, (melting point of adhesive layer)≦(heating temperature)≦(melting point of porous sheet);

(2) relationship between the heating temperature during heat pressing, the melting point of the adhesive layer and a softening point of the porous sheet is satisfied with a following equation, $7.5/(ts+2)^{1.3} < h < -0.5t+3$, wherein ts=(heating temperature)−(m.p. of adhesive layer), t=(heating temperature)−(softening point of porous sheet), and h=heating time; and (3) the unrolling tension of said porous sheet is maintained within a range of 200 to 550 g/mm².

2. A method for laminating a porous sheet and a coarse mesh reinforcing material as set forth in claim 1, wherein said coarse mesh reinforcing material is a non-woven fabric or woven fabric made of thermoplastic resin composed by cross-laminating or cross-weaving at least one type of uniaxial oriented material selected from the group consisting of (a), (b) and(c) below so that the orientation axes thereof cross:

(a) a split web in which a film is uniaxially drawn longitudinally or transversely and split in a direction of drawing (split treatment);

(b) a slit web in which a film is uniaxially drawn in a direction of slits after forming a large number of slits either longitudinally or transversely in said film; and, (c) a uniaxially oriented, multi-layer tape.

3. A method for laminating a porous sheet and a coarse mesh reinforcing material as set forth in claim 2 wherein said uniaxially oriented material is a multi-layer drawn material comprising a crystalline first thermoplastic resin and a second thermoplastic resin having a melting point lower than that of said first thermoplastic resin.

4. A method for laminating a porous sheet and a coarse mesh reinforcing material as set forth in claim 3 wherein a difference in the melting points between said first thermoplastic resin and said second thermoplastic resin is 5° C. or more.

5. A method for laminating a porous sheet and a coarse mesh reinforcing material as set forth in claim 3 wherein said multi-layer drawn material is a multi-layer film of at least two layers selected from a resin composition selected from the group consisting of high-density polyethylene (HDPE)/low-density polyethylene (LDPE), HDPE/ethylene-vinyl acetate copolymer (EVA), polypropylene (PP)/propylene-ethylene copolymer (PEC) and polyester (PES)/copolymer polyester (CPEs).

6. A method for laminating a porous sheet and a coarse mesh reinforcing material as set forth in claim 5 wherein said multi-layer drawn material is a multi-layer film comprising the layer composition of HDPE/LDPE or LDPE/HDPE/LDPE.

7. A method for laminating a porous sheet and a coarse mesh reinforcing material as set forth in claim 1 wherein said porous sheet is a film obtained by drawing a thermoplastic resin after blending with a filler.

8. A method for laminating a porous sheet and a coarse mesh reinforcing material as set forth in claim 7 wherein said thermoplastic resin is a polyolefin-based resin.

* * * * *